Nov. 3, 1959 R. C. DU BOIS 2,911,008
FLUID FLOW CONTROL DEVICE
Filed April 9, 1956 3 Sheets-Sheet 1

Inventor
Robert C. Du Bois

Nov. 3, 1959  R. C. DU BOIS  2,911,008
FLUID FLOW CONTROL DEVICE

Filed April 9, 1956  3 Sheets-Sheet 2

Inventor
Robert C. DuBois
by Roberts Cushman & Grover
Att'ys

Nov. 3, 1959    R. C. DU BOIS    2,911,008
FLUID FLOW CONTROL DEVICE

Filed April 9, 1956    3 Sheets-Sheet 3

Inventor
Robert C. Du Bois
by Roberts Cushman & Grimes
Att'ys

United States Patent Office 2,911,008
Patented Nov. 3, 1959

2,911,008

FLUID FLOW CONTROL DEVICE

Robert C. Du Bois, Fairfield, Conn., assignor to Manning, Maxwell & Moore, Incorporated, Stratford, Conn., a corporation of New Jersey Application April 9, 1956, Serial No. 576,945

16 Claims. (Cl. 137—625.31)

This invention relates to fluid flow control means, and more especially to a device of adjustable type for restricting the flow of a fluid. While of more general utility the device of the present invention is herein illustrated by way of specific example, but without limiting intent, in its application as a flow restricting element in a pneumatic transmitting system. Such systems are commonly used, for example, in the remote control of or for indicating or recording variable conditions in an industrial processing apparatus or the like, and usually employ an elastic fluid, for instance air, as the signal transmitting medium. In the design of such systems it has been found desirable, especially in systems where the measurement of temperature is involved, to provide an additional mode of response which is proportional to the rate or first derivative with time of the variable condition. For this purpose it has been common to provide a delay in the feed-back action of the transmitter and usually with provision for adjustment of this delay so that it may be set to provide the best response under widely different conditions. One common way of providing such delay is by the use of a restriction in the feed-back line, which, acting in series with a capacitance, provides the time delay. Customarily this restriction has been in the nature of a needle valve manually operated, and in order that a wider range of time delay may be provided for without causing instability in the transmitter itself, it is customary to provide a capacitance in parallel with the variable restriction, for instance a bellows enclosed within a suitable chamber.

Although it is customary to employ a needle valve as the restriction in the feed-back line as above noted, such a valve is not wholly satisfactory, not only because of difficulties involved in the design of a valve of this type intended to provide extreme attenuation of the fluid flow but because the inherent design of a needle valve is such that it easily clogs with dust or other particles carried by the fluid stream. It has also been proposed to employ a passage of capillary type and of variable effective length as the flow restricting means. However, this arrangement is subject to certain limitations (in embodiments of practical size) with respect to the range and degree of attenuation of flow provided.

An object of the present invention is to provide a restriction device of adjustable type useful, for example, in such a transmission system as above referred to, and also, it is contemplated, in other situations where a variable restriction is required, particularly where great range and/or high attenuation of the rate of fluid flow is involved, and such as will not readily be clogged by the accumulation of dust or other particles carried by the fluid stream and which if it does become clogged may readily be cleaned. A further object is to provide an adjustable restriction device which may be so designed that in response to a linear adjustment of the actuating element either a linear or a higher order of variation in the restriction may be obtained. A further object is to provide a novel restriction device which may, if desired, be employed to advantage as an element of a pressure dividing apparatus of that type wherein the flow of fluid from a sigle inlet port to either of two outlet ports or vice versa is controlled by a movable part having at least two flow restricting passages, each of which embodies the principle of the present invention. A further object is to provide an adjustable restriction device of a type which, while ordinarily actuated manually, readily lends itself to automatic adjustment, for example by mechanical or electrical means. A further object of the invention is to provide simple means providing for the simultaneous adjustment of a plurality of variable restrictions. A further object is to provide flow control apparatus designed to be installed in a fluid passageway running between a positive feed-back chamber, a negative feed-back chamber and the output control signal passage of an elastic fluid pressure controller such that two variable restrictions may be simultaneously adjusted. Other and further objects and advantages of the invention will be pointed out in the following more detailed description and by reference to the accompanying drawings, wherein Fig. 1 is a vertical diametrical section through a simple embodiment of the restriction device of the present invention and showing a capacitor in the form of a bellows arranged in parallel relation with the restriction device proper;

Merely as an illustrative instance of the use of such a restrictive device as that herein disclosed, reference may be had to the patent to Ziegler 2,512,561, June 20, 1950, which concerns, in particular, apparatus which responds to temperature variations and wherein a restrictive device such as an ordinary needle valve 22 has associated therewith a stabilizing capacitance 20.

The conventional needle valve, when employed as a restriction in a system of the kind above referred to is inadequate because its basic design places the needle or flow-restricting element at the center of the stream, so that the stream itself is caused to take the form of an annular shell whose radial thickness is substantially less than the radius of a circular passage having the same volumetric capacity. In accordance with the present invention the desired restriction is accomplished by means such that the flow takes place in the form of a solid stream at all capacities, so that danger of clogging is minimized. Moreover, in accordance with the present invention, thorough cleaning of the restriction passage is very easy as compared with the attempted cleaning of a clogged needle valve.

Figures 13, 14:
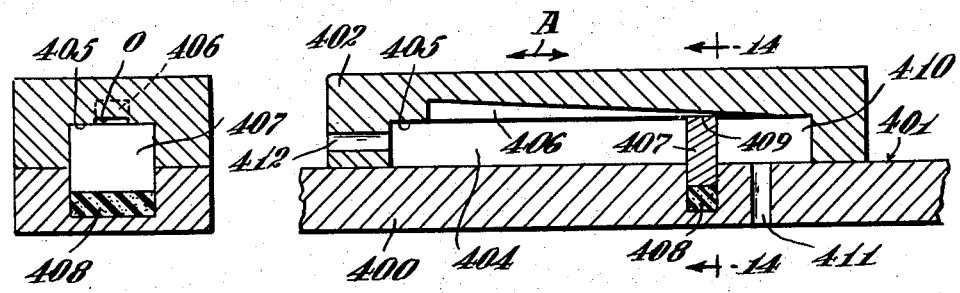
Fig. 13 is a diagrammatic fragmentary vertical section which, in simple form, illustrates the underlying principle of the invention.
Fig. 14 is a section on the line 14—14 of Fig. 13.

Referring to Fig. 13, the principle of the invention is diagrammatically illustrated wherein the numeral 400 represents a rigid plate or base member having a finished and plain horizontal upper surface 401 on which there rests a block 402 having a smooth lower surface, making leak tight contact with the surface 401. The block 401 will be accurately guided to move back and forth in a rectilinear path in the direction of the arrow A.

The block 402 has an elongate chamber 404 in its lower side, it being here assumed that this chamber is rectangular in transverse section. In the roof 405 of this chamber there is an elongate groove 406 (also assumed to be of rectangular transverse section and of less width than the chamber 404), the roof of the groove sloping so that the height of the groove progressively tapers from its left-hand end to its right-hand end. The numeral 407 designates a barrier wall or dam whose lower part seats with a sliding fit in a slot in the base member 400, a resilient element 408 being arranged to urge the barrier wall upwardly to cause its flat edge surface 409 to make leak-tight contact with the ungrooved portion of the roof 405 of the chamber 404. The barrier wall 407 thus normally cuts off communication between the left-hand portion of the chamber 404 and the space 410 to the right of the barrier wall. A fluid flow passage 411 leads down through the base member from the space 410 and another fluid flow passage 412 extends through the block into the chamber 404.

If the block 402 be moved slightly to the left of the position as shown in Fig. 13, no fluid can pass from the chamber 404 into the space 410 to the right of the barrier wall 407. However, when the block is positioned as shown in Fig. 13, a portion of the groove 406 extends across the upper surface 409 of the barrier wall or dam and beyond the right-hand face of said wall or dam. As soon as any portion of the groove passes the plane of the right-hand face of the barrier wall the upper surface 409 and the wall of the groove overlying said surface cooperate to define an orifice O (Fig. 14) through which fluid may flow from the chamber 404 into the space 410. The effective area of this orifice is in the plane of the right-hand surface of the barrier wall or dam 407, and will vary as the block is moved and so causes various portions of the groove to register with the upper surface of the barrier wall.

Thus it is manifest that no fluid can pass from chamber 404 to space 410 except as it flows across the upper edge 409 of the barrier wall or dam 407, and since the barrier wall or dam will usually separate the space 404 in which a relatively high pressure is maintained from the space 410 in which a lower pressure subsists, it is convenient to consider the barrier wall 407 as a dam having the surface 409 as its crest. As shown in Fig. 13, this dam is a simple rectilinear wall standing transversely of the length of the chamber 404 and transversely of the length of the groove 406.

Figure 15:
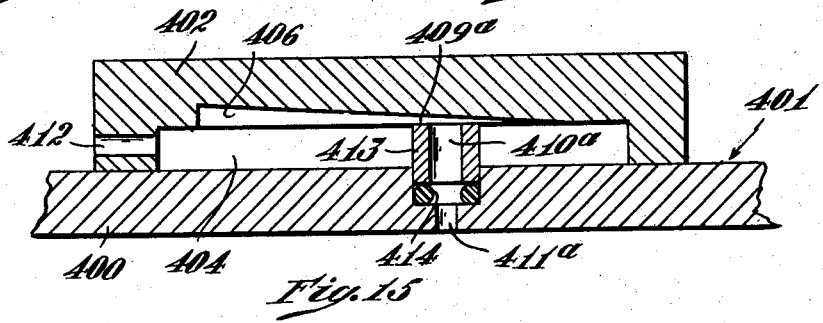
Fig. 15 is a view generally similar to Fig. 13, illustrating a more practical embodiment of the basic principle.

However, it may be more desirable to make this dam in the form of a short tube, here shown as circular, whose axis is perpendicular to the plane of the surface 401 and whose central bore will then function like the space 410 above described. Conveniently said central bore will be in axial alignment with the upper part at least of the passage 411 or its equivalent. Such an arrangement is diagramatically shown in Fig. 15, wherein the rigid seal ring 413 constitutes this annular dam, its flat, annular upper surface 409a constituting the crest of the dam while the space 410a inside this seal ring corresponds in function to the space 410 above described. In this arrangement this space 410 is axially aligned with the passage 411a in the base member 400, the lower edge of the seal ring 413 seating upon a conventional O-ring 414 resting on the bottom of a cavity extending downwardly from the surface 401 of the base 400. This O-ring acts resiliently to urge the seal ring 413 upwardly to cause its upper edge 409a to make leak-tight contact with the roof of the fluid receiving chamber 404, and also to provide a leak-tight seal between the ring 413 and the base member.

By sliding the member 402 to the left or right, the effective area of the orifice where the groove 406 registers with the surface 409a of the seal ring will vary by reason of the slope of the upper wall of the groove, and thus a varied restriction of the flow of the fluid is readily attainable by such adjustment of the part 402. Of course, when the dam is tubular, and the outlet chamber 410a is constituted by its central bore, there are really two orifices located at opposite sides respectively of the bore. Obviously, the rate of variation may be changed by providing a different slope for the upper wall or roof of the groove.

Figures 16, 17:
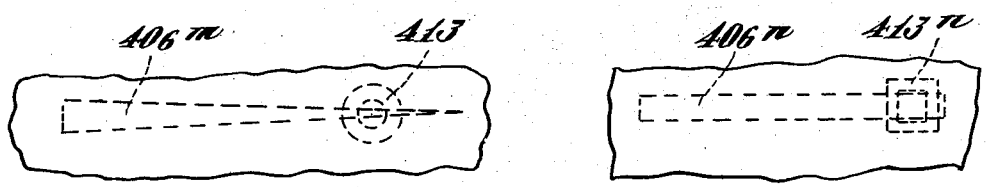
Fig. 16 is a diagram, showing in plan, a groove which tapers in width.
Fig. 17 is a diagram, showing in plan, a groove of uniform width.

In Fig. 16, the dam is indicated at 413 as a circular annulus while the groove 406m is to be understood as of isosceles triangular form in plan but with its converging walls vertical and with its top wall horizontal, so that the variation in transverse section is due entirely to the tapering width of the groove.

In Fig. 17 the dam is a short tube, square in transverse section, indicated by the numeral 413n and is what here for convenience is called a "square annulus," that is to say in plan it is a hollow square, while the groove 406n is of uniform width having parallel, vertical side walls, but with the understanding that the top wall or roof of the groove slopes down from its left-hand end toward its right-hand end.

Figure 18:
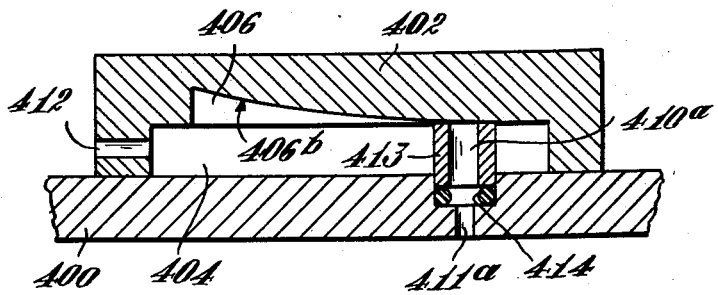
Fig. 18 is a view, generally similar to Fig. 15, but showing a groove designed to provide a non-linear flow attenuation.

In Fig. 18 the arrangement is generally similar to that illustrated in Fig. 14 except that the roof 406b of the groove 406 is of arcuate contour, thus providing an orifice whose area varies progressively in accordance with a non-linear function. Obviously, this form of groove may be used in any of the various embodiments of the invention herein described. For convenience in description the terms "annulus" and "annular" are herein employed as broadly descriptive of a tubular part, usually axially short as compared with its external diameter, and whether the transverse section of this part be circular or, for example, rectangular. It is obvious that when, during motion of the block 402 to the right, the right-hand end of the groove or channel passes the right-hand portion of the upper edge of the ring 413, there will be two spaced sections of the groove at which fluid passes into the bore in the ring 413 and that the effective area of the delivery orifice will be the sum of these two sections.

Figure 1:
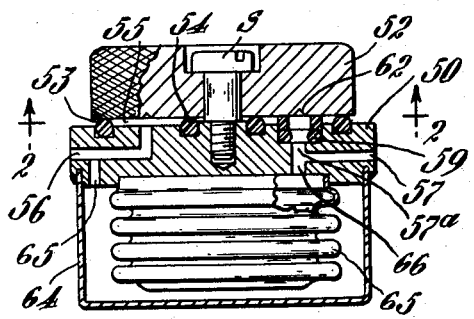
Figure 2:
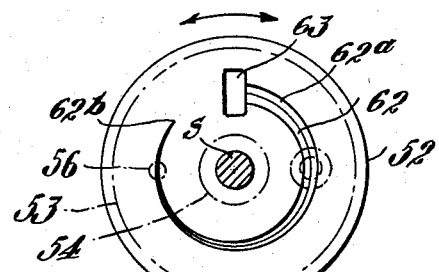
Fig. 2 is a view looking upwardly from the plane of the line 2—2 of Fig. 1, showing the underside of the movable element of the restriction device of Fig. 1.
Figure 3:
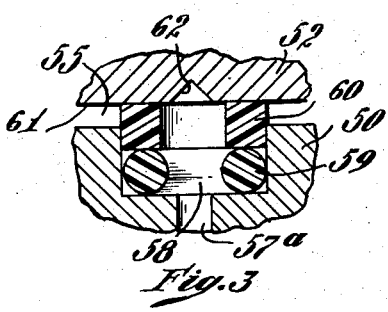
Fig. 3 is a fragmentary vertical section, to larger scale, showing the movable element of the restriction device and the sealing ring which cooperates therewith.

A more practical embodiment of the invention is illustrated, for example, in Figs. 1, 2 and 3. The device as shown in Figs. 1, 2 and 3 is circular in contour, comprising the disk-like normally stationary rigid base 50 and the rotatable knob 52 held in assembled relation to the base by the shoulder screw S which constitutes a stub shaft on which the knob turns. Rotation of the knob 52, relatively to the base, results in variation of the flow restriction. The upper surface of the base 50 near its outer margin, is provided with a groove in which is seated a conventional O-ring 53 of resilient material providing a leak-tight packing between the upper surface of the base 50 and the undersurface of the knob 52. This O-ring 53 is concentric with the shoulder screw or shaft S by means of which the knob 52 is rotatably secured to the base 50. A second O-ring 54 of smaller diameter than the ring 53 is seated in a groove concentric with the screw S and which also forms a leak-tight seal with the undersurface of the knob 52. The rings 53 and 54 project above the upper surface of the base and provide between them a shallow annular chamber 55. A passage 56 in the base leads into the chamber 55, the passage 56, when the device is used as an element of a pneumatic transmitter system such as above described being connected by a suitable conduit (not shown) to an air relay. At a point, here shown (but not necessarily so) as diametrically opposite to the passage 56, the base provided with an outlet or delivery passage 57 which, when the device is employed as above suggested, will be connected by a suitable conduit (not shown) to the feed-back of the system. The delivery passage 57 is provided with an upward extension 57a (Figs. 1 to 3) whose upper end opens into a circular cavity 58 (Fig. 3) coaxial with the upward extension 57a of passage 57 and within which there is arranged a resilient O-ring 59. In this cavity or chamber 58 and on the O-ring rests a tubular dam or sealing ring 60, movable relatively to the base 50, and having an accurately finished and flat upper surface which contacts the finished under surface 61 of the knob 52 with resilient pressure, the contact between these surfaces being sufficiently accurate so that normally pressure fluid from the chamber 55 cannot pass between the upper surface of the ring 60 and the undersurface of the knob 52 into the space at the center of the sealing ring.

As more particularly illustrated in Fig. 2, a groove 62 is formed in the underside of the knob 52, this groove as here illustrated being triangular in vertical section (Fig. 3) and tapering in height and in base width from its wide end 62a (Fig. 2) to its narrow end 62b, the groove being so arranged that its apex edge is a circle coaxial with the shaft S. Desirably the wider end 62a of this groove opens into a slot 63 of transverse dimensions substantially exceeding the width of the widest part of the groove.

The groove is freely open to the chamber 55 except for such portions of the groove as extend across the upper edge of the seal ring or dam 60. Thus it is always possible for pressure fluid to enter the groove from the chamber 55, and so long as any portion of the groove extends transversely across one edge of the seal ring, pressure fluid will flow along that part of the groove which overlies the upper edge or crest of the seal ring or dam and will enter the central bore in the seal ring and thus move down through the passage 57a and into the outlet passage 57. It may be noted that at the place or places where the groove crosses the seal ring or dam the upper surface of the seal ring forms the crest of the dam and the effective floor of the groove so that at this point or these points the transverse sectional area of the groove is definitely fixed. This portion of the groove constitutes a short delivery channel of fixed length (equal to the radial thickness of the seal ring) and the delivery end of this short delivery channel thus constitutes the effective restriction, the transverse area of the bore in the seal ring being at least as great as that of the delivery section of the channel so that any fluid emerging from the channel into the bore in the seal ring is free to escape. By turning the knob 52 varying transverse sections of the groove are brought to coincide with the upper surface of the seal ring 60 so that the degree of restriction will be varied accordingly. When the slot 63 is brought into coincidence with the bore of the seal ring, then a maximum and unrestricted flow between the chamber 55 and the outlet passage 57a is provided.

As illustrated in Fig. 1, a casing 64 is secured to the base 50 and a branch passage 65 leads into the interior of this casing from the inlet passage 56. Within this casing there is arranged a bellows 65a having its upper end secured to the base 50, and a branch passage 66 leads into this bellows from the passage 57. Such a bellows, within a closed housing, is useful as a capacitance in parallel relation with the restriction device of the present invention, but forms no part of the present invention.

Figure 4:
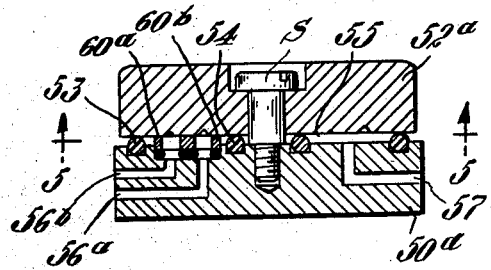
Fig. 4 is a vertical section similar to Fig. 1, but showing the principle of the present invention as incorporated in a pressure divider of simple type.
Figure 5:
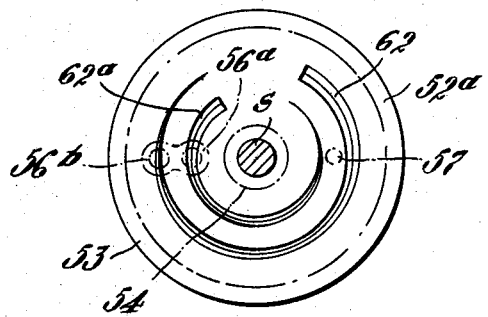
Fig. 5 is a view looking up from the plane of the line 5—5 of Fig. 4, showing the underside of the movable element of the device of Fig. 4.

The arrangement illustrated in Figs. 4 and 5 constitutes a pressure divider in which restriction means such as above described is employed. The device shown in these views is circular in contour, comprising the rigid base member 50a, generally similar to the base 50 of the device previously described, except that it has two inlet passages 56a and 56b. This base also has the single outlet passage 57 and the inner and outer concentric O-rings 53 and 54 defining between them the shallow chamber 55 between the upper surface of the base and the undersurface of the rotary knob 52a which is rotatably secured to the base by the shoulder screw S or stub shaft. The passages 56a and 56b have upward extensions which open into chambers like the chambers 58 above described, in each of which there is seated an O-ring. On these O-rings rest rigid sealing rings 60a and 60b respectively, here shown (Fig. 4) as integrally joined, the upper surfaces of these rings making leak-tight contact with the flat undersurface of the knob 52a. The undersurface of the knob 52a is provided (Fig. 5) with two grooves 62 and 62a respectively, similar in type to the groove 62 above described, and with their apex edges forming circular arcs coaxial with the shaft S. In this arrangement the taper of the grooves is in opposite directions. One of these grooves is arranged to register with the space within the O-ring 60a, while the other groove is arranged to register with the space within the O-ring 60b. It will be manifest that if, for example, fluid at different pressures be supplied to the inlets 56a and 56b, the pressure which enters the chamber 55 will vary according to the sum of the areas of the two grooves 62 and 62a, which at any instant may register with the inner edges of the seal rings 60a and 60b respectively. By proper shaping of the restriction grooves it is possible to maintain a constant restriction between the two ports formed by the seal rings. By rotating the knob it is possible to change the ratio of the restriction between the outlet 57 and the inlet ports defined by the seal rings 60a and 60b. Obviously, the port 57 may be the inlet and the ports 56 and 56b the outlet ports, if desired.

Figure 6:
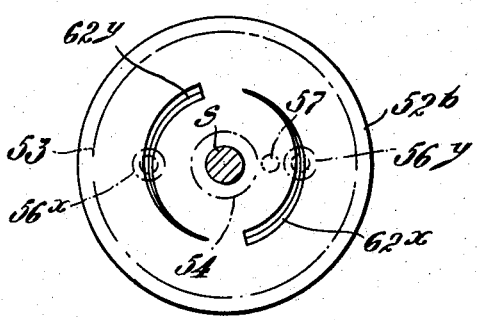
Fig. 6 is a view similar to Fig. 5, but showing a pressure divider of another type embodying the principle of the present invention.

Fig. 6 illustrates another modification wherein the base (not shown) is provided, as indicated in broken lines, with inlet passages 56x and 56y at diametrically opposite sides of the shaft S and also with the outlet passage 57. The knob 52b is provided at its underside with grooves 62x and 62y, each similar to the groove 62 above described, and of substantially the same diameter and arranged concentrically with the shaft and tapering in the same direction. Each of these grooves is arranged to cooperate with a seal ring at the upper end of the inlet port 56x and 56y respectively, thus providing an arrangement differing in details of construction from that of Figs. 4 and 5 and having somewhat different capabilities, insofar as function is concerned.

Figure 7:
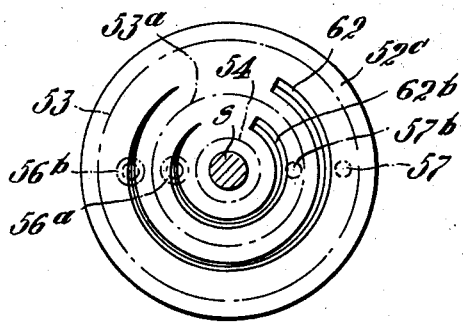
Fig. 7 is a view similar to Fig. 6, but illustrating a different arrangement of the flow restricting grooves.

Fig. 7 illustrates an arrangement whereby two independent restriction grooves may be combined in a single unit. In this device the base (not shown) is provided, as indicated by the broken lines, with two inlet passages 56a and 56b like that of Figs. 5 and 6, but it is also provided with two independent outlet passages 57 and 57b. The underside of the rotatable knob is provided with two concentric grooves 62 and 62b, both tapering in the same direction and so arranged that one coincides with a sealing ring at the upper end of the inlet passage 56a, while the other cooperates with a sealing ring at the upper end of the passage 56b. A third O-ring 53a intervenes between the grooves 62 and 62a, thus providing independent chambers from which the outlet passages 57 and 57a lead.

Grooves such as above described may readily be formed by placing the knob in a lathe chuck and mounting a properly shaped tool in the tool rest of the lathe, and, after contacting the tip of the tool with the face of the knob, moving the tool toward the knob by the feed screw of the lathe while turning the knob through the desired arc. Obviously, by the use of properly designed cams the cutting tool might be so controlled as to form a groove of almost any desired contour and with a cross-section varying, if desired, in accordance with a non-linear function.

Since by removing the screw S the knob may be completely separated from the base, thus exposing the entire length of the groove, it is very easy to clean the groove if it become clogged with dirt during use.

Figure 8:
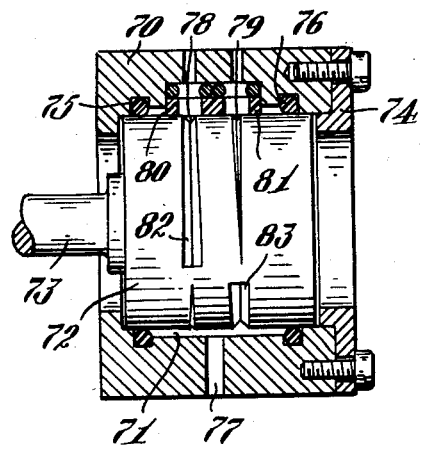
Fig. 8 is a diametrical section illustrating the principle of the present invention as embodied in a flow restricting device wherein the grooves are in the peripheral surface of a rotatable cylinder.

Fig. 8 illustrates a pressure divider embodying the principle of the present invention, but in which the restriction groove is formed on the peripheral surface of a cylindrical block. In this device the stationary member or base takes the form of a cylinder 70 having an internal chamber 71 within which is arranged the cylindrical plug or block 72. At its left end, as shown in Fig. 8, the plug is provided with a shaft 73 by means of which it may be turned relatively to the casing 70. At its opposite end the plug bears against a removable ring 74 secured to the casing and which holds the plug in assembled relation with the casing. Near the opposite ends of the chamber 71 the inner wall of the latter is provided with grooves in which the O-rings 75 and 76 are seated. Substantially midway between these O-rings the casing is provided with an outlet port 77, while at its diametrically opposite side it is provided with the axially spaced inlet ports 78 and 79. The effective inner end of each of these inlet ports is defined by a seal ring or dam 80 and 81 respectively, which may be integrally joined as shown in Fig. 8, having inner surfaces which are cylindrically curved to make leak-tight contact with the finished peripheral surface of the plug 72. As shown in Fig. 8, the plug is provided with two peripherally extending grooves 82 and 83, here shown as tapering from one end toward the other, the tapering of the respective grooves being in opposite directions circumferentially of the plug. These grooves are arranged to register with the interiors of the seal rings 80 and 81 respectively. Rotation of the plug 72 in one or the other direction changes the effective areas of the sections of the two grooves where the grooves register with the respective seal rings and thus varies the ratio of the pressures provided at the inlets 77 and 78 and so determines the pressure at the outlet port 77, in the same way as the device illustrated in Figs. 5 and 6.

Figure 9:
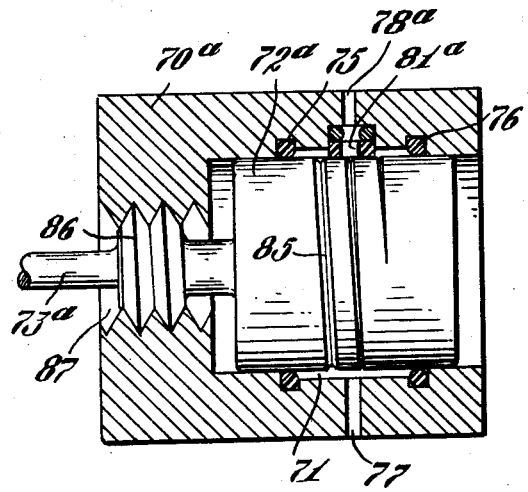
Fig. 9 is a view generally similar to Fig. 8, but showing a pressure divider embodying the principle of the present invention, wherein the flow restricting grooves are formed on a cylindrical surface.

The arrangement shown in Fig. 9 has for its purpose the provision of a greater range of attenuation than is provided in apparatus such as illustrated in Fig. 1 for example, but without making the apparatus of undue diameter. The arrangement of Fig. 9 is of the same general type as that shown in Fig. 8, comprising the casing 70a having the cylindrical internal chamber 71, in which there is arranged a rotatable cylindrical plug 72a having a stem 73a by means of which it may be turned. Near its opposite ends the chamber 71 is provided with O-rings 75 and 76 seated in suitable grooves in the chamber wall, and the sealed-up portion of chamber 71 between these rings communicates with the outlet passage 77. In this arrangement there is a single inlet passage 78a whose effective inner end is defined by a rigid seal ring or dam 81a set into a recess coaxial with the passage 78a, and whose inner surface is concentrically curved to make leak-tight contact with the outer surface of the plug 72a. A single restriction groove 85 is formed in the outer surface of this plug 72a, but in this instance the groove makes several complete turns about the plug. Thus the total length of the groove may be much greater than that of the groove 62 of Fig. 8, thus permitting a greater range in the restriction or permitting a more gradual attenuation. This groove 85 is arranged as a helix of predetermined pitch, and in order that the groove may at all times register with the interior of the stationary seal ring 81a, the shaft 73a is provided with a screw thread 86 of the same pitch as the helical groove 85, this screw thread engaging a threaded bore 87 in the casing 70a. Thus as the shaft 73a is turned the plug 72a is moved axially (while rotating) just sufficiently to keep the groove 85 always in register with the opening in the seal ring 81a.

Figure 10:
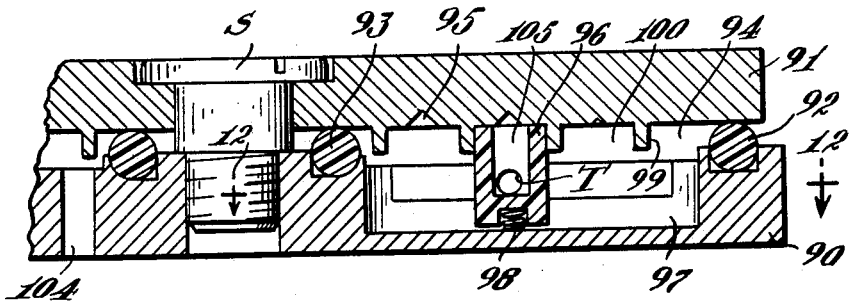
Fig. 10 is a fragmentary radial section, to larger scale, showing an arrangement generally similar to that of Fig. 1, but with provision for greatly increasing the range of flow restriction.
Figure 11:
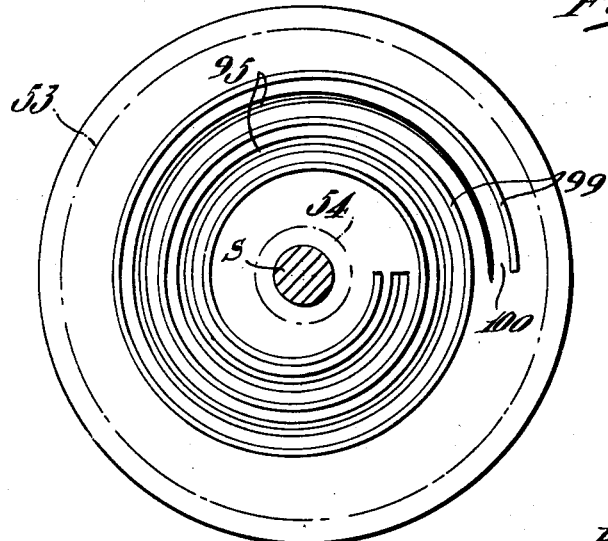
Fig. 11 is a bottom view of the movable element of the device of Fig. 10.
Figure 12:
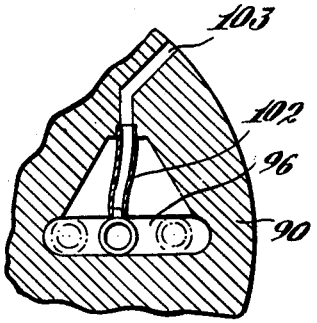
Fig. 12 is a fragmentary section substantially on the line 12—12 of Fig. 10.

The arrangement illustrated in Figs. 10, 11 and 12 is a modification of that shown in Figs. 1, 2 and 3, but so arranged as to permit the employment of a guide groove of more than 360° extent. In this arrangement the base 90 and the rotatable knob 91 are held in assembled relation by means of the shoulder screw or stub shaft S. The base 90 is provided in its upper surface with concentric grooves which receive the O-rings 92 and 93 defining between them the air-tight chamber 94. In the undersurface of the knob 91 there is provided a restriction groove 95 (Fig. 11) of the same general type as that above suggested, except that in this instance this restriction groove is in the form of a spiral here shown as of two complete turns, the groove progressively tapering in transverse dimensions from its inner to its outer end.

A sealing element or dam 96 engages the undersurface of the knob 91 with a leak-tight contact. This sealing element as here illustrated is cup-like in construction, having a recess in its bottom which receives a coiled compression spring 98 which urges the ring upwardly toward the knob 91. The undersurface of the knob 91 is provided with a downwardly directed rigid rib 99 of the same type of spiral curvature as the groove 95 and which is so arranged as always to be at the same distance radially from the grove. The vertical faces of this rib are finished to make smooth sliding contact with the lateral surfaces of the seal element 96. The lower part of this seal element is arranged within a radial slot 97 (Fig. 10) in the base 90 so that the sealing element may move in a radial direction. As the knob 91 is turned, the rib 99, acting as a cam, moves the sealing element 96 in or out, thus keeping the space 105 within the upper part of the sealing element always in registry with the groove 95. The sealing element is provided with a port T in its wall, and this port is connected by a flexible tube 102 (Fig. 12) with an outlet port 103 in the base 90. An inlet port 104 (Fig. 10) in the base admits fluid pressure into the chamber 94, and since some portion of the groove 95 always opens into this chamber, the fluid pressure follows along the groove to the sealing element where the sum of those sections of the groove which are in registry with the upper edge of the sealing element defines the effective restriction at any given setting of the knob 91. This arrangement permits the employment of a restriction groove of very substantial length without unduly increasing the diameter of the apparatus as a whole.

In the description and drawings one of the parts has been described as movable relatively to the other, but in general it is to be understood that it is immaterial which of said parts is the movable part (in fact, both may be movable if desired). Moreover, it is contemplated that the groove and dam may be reversely arranged as respects the part with which they are associated, and that the device is operative to control the flow of other fluids than air. It will further be understood that by change in dimensions the principle of the invention may be embodied in apparatus for controlling the flow of much greater volume of fluid than is to be expected in devices of the specific utility above suggested.

While various utilities of the restriction element of the present invention have herein been suggested and illustrated, it is contemplated that other arrangements and variations in the use of this restriction device will occur to those skilled in the art, and it is to be understod that any and all such modifications, rearrangements and utilities of the invention as fall within the terms of the appended claims are to be considered as being within the scope and field of the invention.

I claim:

1. A flow restriction device comprising a normally stationary member and a relatively movable member, said members having spaced opposed surfaces which are always the same distance apart, the surface of the movable member being a finished surface, means which define the lateral wall of a fluid-receiving chamber whose other walls are constituted by said opposed surfaces of said members, one of said members having therein a passage providing communication between said chamber and the exterior of the device, the stationary member having a fluid passage the inner end of which opens at the aforesaid surface of said stationary member, said latter passage extending to the exterior of the stationary member, the latter member carrying a tubular dam which projects from its aforesaid surface and extends across the fluid-receiving chamber and has a finished end face which always contacts the opposed finished surface of the movable member, the interior of said dam always communicating with the fluid passage in the stationary member, the dam being operative, when the stationary and movable members are in a certain relative position of adjustment, to constitute a barrier to prevent fluid flow between the fluid-receiving chamber and the inner end of said fluid passage in the stationary member, the movable member having in its finished surface, an elongate groove which increases progressively in transverse section from one end toward the other, said groove being of such configuration and so located that as the result of adjustment of the movable member relatively to the stationary member, any selected portion of the length of the groove may be made to register with the end face of the dam thereby providing at least one channel of fixed length connecting the fluid-receiving chamber and the inner end of said fluid passage in the stationary member, the wall of the tubular dam being of such a thickness, in the direction of fluid flow, that the length of said channel does not substantially exceed the diameter of said passage in the stationary member.

2. A flow restriction device comprising a normally stationary member and a relatively movable member, said members having spaced opposed surfaces which are always the same distance apart, resilient means interposed between said surfaces making leak-tight contact therewith and defining the lateral wall of a fluid-receiving chamber whose other walls are constituted by the aforesaid surfaces of the fixed and movable members respectively, the normally stationary member having therein at least two fluid passages, one end of each of said passages being at said surface of the stationary member, the passages extending to the outside of the stationary member, a rigid tubular dam whose interior always communicates with one of said fluid passages, said dam projecting from said surface of the fixed member across the fluid-receiving chamber, the dam having a finished end face which always contacts said opposed surface of the movable member and thereby, in certain relative positions of the stationary and movable members, prevents fluid flow between the fluid-receiving chamber and the fluid passage which communicates with the interior of the tubular dam, the movable member having, in its aforesaid surface, an elongate groove which increases progressively in transverse section from one end toward the other, the groove being of such longitudinal configuration and so located that as the result of adjustment of the movable member relatively to the fixed member, a selected portion of the length of the groove may be made to register with the end face of the tubular dam, thereby providing two short delivery channels each of a fixed length equal to the thickness of the wall of the dam but which varies in width in accordance with the position of the movable member relatively to the fixed member.

3. A flow restriction device according to claim 1, wherein the inner end portion of the passage in the stationary member is diametrically enlarged to form a dam-receiving cavity, and the dam is slidably arranged within said cavity, resilient means urging the dam in an axial direction bodily toward the movable member thereby to maintain its end face in leak-tight contact with the opposed finished surface of the movable member, the major portion of the length of said groove always being in free communication with said fluid-receiving chamber but being of such longitudinal configuration and so located that, as the result of adjustment of the movable member relatively to the fixed member, different selected portions of the length of the groove register with the crest of the dam thereby providing at least one delivery channel of a fixed length equal to the thickness of the wall of the tubular dam but varying in width in accordance with the position of the movable member relatively to the fixed member, the thickness of the wall of the dam, in the direction of fluid flow, being small as compared with the length of said groove.

4. A flow restriction device according to claim 1, wherein the finished outer end surface of the dam is of such contour that when said members occupy certain relative positions of adjustment, two delivery channels of different transverse widths, respectively, result.

5. A flow restriction device according to claim 1, wherein the dam is a short cylinder having an axial bore which is coaxial with the inner end portion of said fluid passage in the stationary member, the end surface of the dam being flat and annular.

6. A flow restriction device according to claim 1, having a dam-receiving cavity in the fixed member which is circular in transverse section and wherein the dam is a cylindrical member slidably fitting within said chamber, its outer, circular end surface constituting its crest, and having a resilient ring within the dam-receiving cavity upon which the cylindrical dam rests and which maintains the crest of the dam in leak-tight contact with the opposite surface of the movable member.

7. A flow restriction device according to claim 1 wherein the relatively movable members have substantially flat, parallel opposed surfaces, means connecting said members for relative rotational motion about an axis perpendicular to said surfaces, and wherein the means which provides the lateral wall of the fluid-receiving chamber comprises concentric O-rings whereby the fluid-receiving chamber is annular and coaxial with the axis of rotation.

8. A flow restriction device according to claim 5, wherein the groove in the rotatable member is triangular in transverse section and of a longitudinal configuration such that the apex of the triangle is concentric with the axis of rotation of the movable member.

9. A flow restriction device comprising a normally fixed base, a knob, and pivot means holding the knob and base in assembled relation with provision whereby the knob may be rotatably adjusted relatively to the base, the base having a horizontal upper surface and the knob having a horizontal lower surface, concentric O-rings interposed between said surfaces and holding said surfaces spaced apart, the annular space between the O-rings constituting a chamber for the reception of pressure fluid, the base having passages through which pressure fluid may be admitted to said chamber and discharged therefrom, respectively, one of said passages leading downwardly from a recess in the base which opens at the upper surface of the base, an O-ring seated in said recess and a rigid sealing annulus, which constitutes a dam, resting on the O-ring, the sealing annulus extending completely across the chamber and having a smooth end surface which contacts said lower surface of the knob, leak-tight, the knob having in its lower surface a groove of progressively varying transverse section, said groove being coaxial with the pivot means and of such radius that by adjustably rotating the knob, any selected portion of the length of the groove may be arranged to extend transversely across said end surface of the annulus, that minor portion of the length of the groove, which at any time registers with the end surface of the sealing annulus, coacting with the latter to define at least one flow-restricting channel, the major portion of the length of the groove normally communicating with the fluid-receiving chamber.

10. A flow restriction device according to claim 1, wherein one of said movable parts is cylindrical and turns leak-tight in axially spaced bearings in the other of said parts, one of said parts having a circumferentially extending recess located intermediate said bearings and which constitutes the fluid receiving chamber, the groove extending circumferentially of the other of said parts, the dam being carried by that part which has the circumferential recess and extending across the recess with its crest making leak-tight contact with the opposed cylindrical surface of the other of said parts.

11. A flow restriction device according to claim 1, wherein one of said movable parts is a cylindrical plug turning leak-tight in axially spaced bearings formed in the other of said parts, the latter part having a circumferentially extending internal recess located between said bearings and constituting the fluid receiving chamber, the groove being in the peripheral surface of the plug, the dam being a cylinder having an axial bore which is radial with respect to the axis of the plug and which is carried by that part in which the recess is formed and extending radially inward across the recess with its crest making leak-tight contact with the peripheral surface of the plug.

12. A flow restriction device according to claim 1, wherein the movable member has therein independent grooves, each of varying transverse section, each of said grooves being in constant free communication, throughout the major portion of its length, with said chamber, a plurality of dams, in number equalling the number of grooves, each dam being mounted in the fixed member and extending transversely across said fluid-receiving chamber, and having an end surface which makes leak-tight contact with the movable member, each dam being so constructed and arranged as normally to cut off a corresponding space from the chamber proper, the spaces so cut off being always in communication with corresponding independent flow passages in said fixed member, the several grooves being so located that relative movement of said members will bring successive portions of each respective groove into registry with said end surface of a corresponding one of said dams, thereby to define at least one orifice through which fluid may flow between said chamber and the corresponding passage, and wherein the width of the crest of each respective dam, in the direction of fluid flow, does not substantially exceed the diameter of the corresponding flow passage, each dam having an annular wall separating the space within it from the fluid-receiving chamber proper, the space within each annular wall always being in communication with a corresponding one of said independent passages in the stationary member, the several grooves being so located that relative rotation of said members will cause successive portions of the respective grooves to register with the crests of the corresponding dams.

13. A device according to claim 1, having a plurality of annular dams mounted in the fixed member and having their end faces in leak-tight contact with the movable member, the fixed member having independent passages communicating with the interiors of the respective dams, the movable member having a plurality of elongate grooves each of varying transverse triangular section, and each groove being in constant communication with said chamber, said grooves being so arranged that by rotation of the rotatable member successive portions of each respective groove may be caused to extend transversely across the crest of a corresponding one of said dams.

14. A pressure divider according to claim 13, wherein the several grooves are arcuate and progressively taper in transverse area from one end toward the other, the taper of adjacent grooves being in opposite directions.

15. A pressure divider according to claim 13, wherein the several grooves are arcuate and coaxial with the movable member and progressively taper in transverse area from one end toward the other, the taper of adjacent grooves being in the same direction.

16. A pressure divider according to claim 13, wherein the fixed member is a part having therein a cylindrical cavity and the movable part is a cylindrical plug disposed within said cavity, the wall of the cavity having axially spaced bearing surfaces within which the plug turns, the wall of the cavity having therein a recess intermediate said bearing portions which constitutes the fluid receiving chamber, the fixed member having a plurality of passages, the tubular dams being seated in recesses in the fixed member, the end faces of the dams being so curved as to make leak-tight contact with the periphery of the plug, each groove being disposed in the diametrical plane through the axis of one of the dams, respectively.

References Cited in the file of this patent

UNITED STATES PATENTS

| | | |
|---|---|---|
| 1,015,297 | Chatillon | Jan. 23, 1912 |
| 1,076,281 | Gray | Oct. 21, 1913 |
| 1,314,987 | Smith | Sept. 2, 1919 |
| 1,527,927 | Schroder | Feb. 24, 1925 |
| 1,983,213 | Brady et al. | Dec. 4, 1934 |
| 2,012,004 | Hall et al. | Aug. 20, 1935 |
| 2,236,084 | Brown | Mar. 25, 1941 |
| 2,290,783 | Turpin | July 21, 1942 |
| 2,323,115 | Bryant | June 29, 1943 |
| 2,384,078 | Curtis | Sept. 4, 1945 |
| 2,447,920 | Terry | Aug. 24, 1948 |
| 2,572,950 | Rider | Oct. 30, 1951 |
| 2,631,811 | Malloy | Mar. 17, 1953 |
| 2,633,325 | Whitlock | Mar. 31, 1953 |
| 2,766,771 | Wenzel | Oct. 16, 1956 |

FOREIGN PATENTS

| | | |
|---|---|---|
| 21,477 | Great Britain | Aug. 1, 1912 |
| 628,170 | France | June 21, 1927 |
| 560,262 | Great Britain | Mar. 28, 1944 |